US006035561A

United States Patent [19]

Paytas et al.

[11] Patent Number: 6,035,561

[45] Date of Patent: Mar. 14, 2000

[54] BATTERY POWERED ELECTRIC SNOW THROWER

[76] Inventors: Karen A. Paytas, 28177 Palomino, Warren, Mich. 48093; Jason J. Halleck, 8183 Dale, Centerline, Mich. 48015

[21] Appl. No.: 08/826,158

[22] Filed: Mar. 27, 1997

Related U.S. Application Data

[63] Continuation-in-part of application No. 08/479,651, Jun. 7, 1995, abandoned.

[51] Int. Cl.[7] .............................. F01H 5/09; H01R 3/00; B60R 16/04

[52] U.S. Cl. ................................ 37/246; 37/244; 37/248; 180/68.5; 439/500

[58] Field of Search ............................ 37/244, 246, 248; 320/61, 63; 180/65.6; 33/561; 439/500, 682; 429/123, 98; 474/101, 112, 113, 114, 115, 118

[56] References Cited

U.S. PATENT DOCUMENTS

| | | | |
|---|---|---|---|
| 2,605,561 | 8/1952 | Maynard et al. . | |
| 3,267,594 | 8/1966 | Mattson et al. . | |
| 4,104,812 | 8/1978 | Stribiak, Jr. | 37/243 |
| 4,295,285 | 10/1981 | Stevens . | |
| 4,329,792 | 5/1982 | Berner | 37/246 |
| 4,353,422 | 10/1982 | Bennett, Jr. . | |
| 4,549,365 | 10/1985 | Johnson . | |
| 4,560,046 | 12/1985 | Lorello et al. | 474/115 X |
| 4,566,689 | 1/1986 | Ogden | 474/115 X |
| 4,660,372 | 4/1987 | Stahlecker | 474/115 X |
| 4,756,978 | 7/1988 | Nictcher et al. . | |
| 4,846,295 | 7/1989 | Shepard et al. . | |
| 5,161,318 | 11/1992 | Bergman et al. . | |
| 5,402,626 | 4/1995 | Zinck . | |
| 5,406,778 | 4/1995 | Lamb et al. . | |
| 5,432,019 | 7/1995 | Hue . | |
| 5,442,901 | 8/1995 | Niemela et al. . | |

*Primary Examiner*—Thomas B. Will
*Assistant Examiner*—Gary S. Hartmann

[57] ABSTRACT

A snow thrower (10) includes a rotatable wheel (12) for collecting the snow and a chute (14) for throwing the snow away from the snow thrower (10). The snow thrower (10) includes a motor (22) and a battery (24) connected thereto for providing power to the motor (22), which in turn drives a drive belt (28) to rotate the rotatable wheel (12). The battery (24) may be removed and replaced by sliding same out of the thrower housing (16), and includes spring biased contacts between the housing (16) and battery terminals to cause electrical connection therebetween.

17 Claims, 4 Drawing Sheets

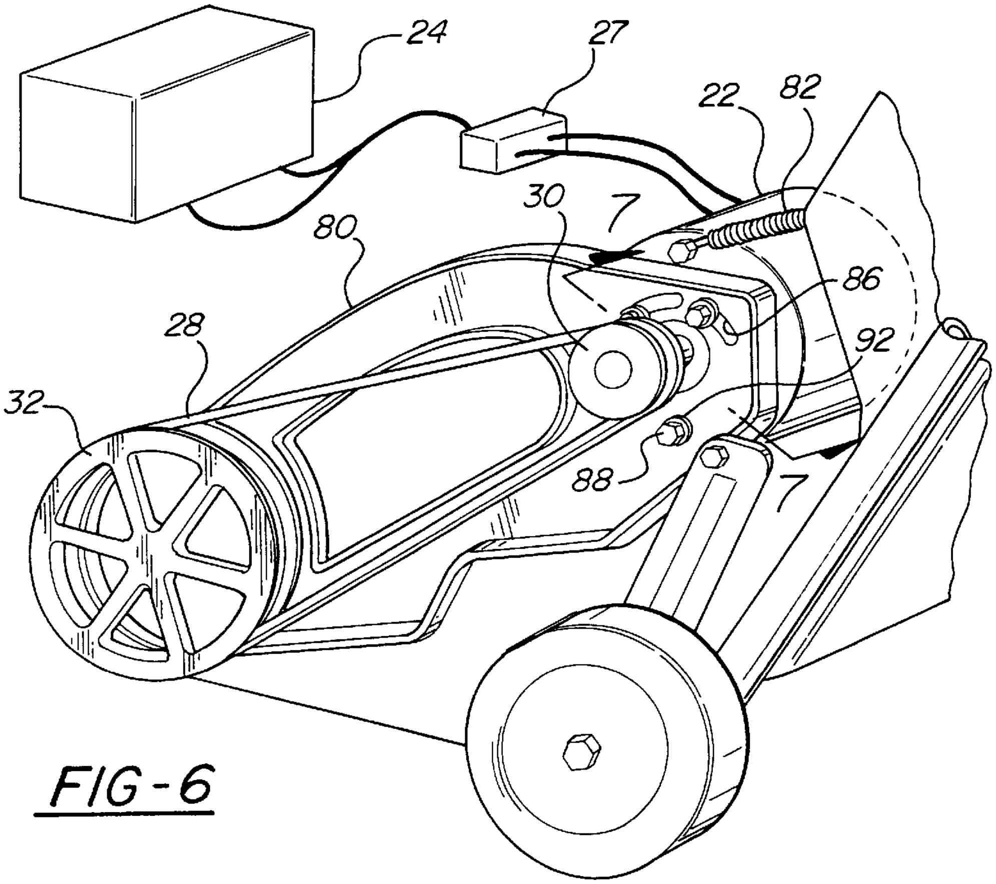
FIG-6
FIG-7
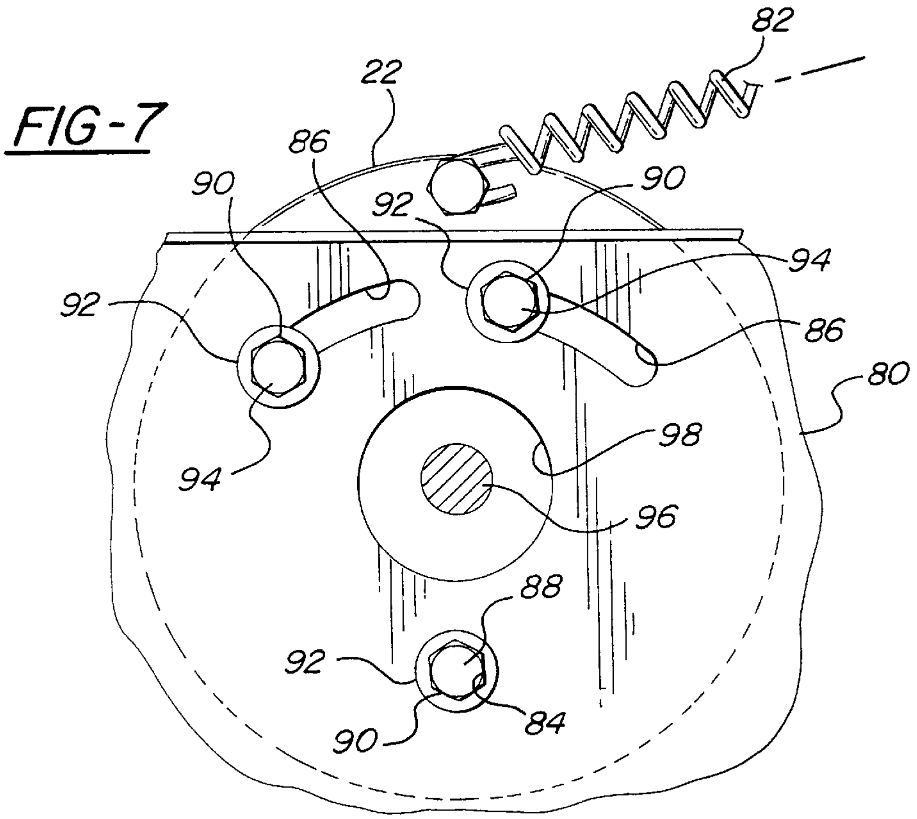

BATTERY POWERED ELECTRIC SNOW THROWER

This is a continuation-in-part of copending application Ser. No. 08/479,651 filed on Jun. 7, 1995, now abandoned.

TECHNICAL FIELD

The invention relates to snow throwers or snow blower devices for removing snow from roadways, and more particularly toward an improved battery powered snow thrower.

BACKGROUND OF THE INVENTION

Snow throwers are commonly known in the art and include a rotatable wheel or paddle for accumulating snow and throwing the snow away from the area. Such snow throwing devices commonly are of the paddle-type or auger-type. Most snow blowers today utilize a gasoline engine which drives a pulley connected to the wheel assembly of the paddle or auger-type. However, it is desirable to eliminate gasoline engines and utilize electric motors with battery storage capability to allow portability of such snow thrower and easy start.

U.S. Pat. No. 2,605,561, issued Aug. 5, 1952 in the name of Maynard et al discloses a snow plow which is driven by a motor. The motor may be an electric motor or may be a small gasoline motor of the type commonly used on power lawn mowers. When the electric motor is used, it is either connected to a source of power supply by means of a long extension cord, or may be operated by a storage battery carried on the frame of the apparatus in any suitable location. The specification states that if the apparatus is to be used at a considerable distance from a source of electrical current supply, a simple gasoline motor or the like may be used in place of the electric motor illustrated.

The prior art fails to disclose a snow thrower device having the ability to satisfactorily accumulate and throw snow while allowing for portability and benefits associated with a battery powered drive motor.

SUMMARY OF THE INVENTION

The invention is a snow thrower apparatus which comprises a housing, a snow gathering device connected to the housing for collecting snow, a chute for throwing the snow out from said housing, and a battery powered electric motor connected to the snow gathering device for actuating same to collect snow, and a removable battery including terminals for electrical connection to the electric motor. The housing includes quick connect assembly for allowing quick electrical connection between the battery and motor to allow removal and replacement of the battery.

The invention allows for batteries to be replaced within the snow thrower to allow uninterruption and extended duration of use in the clearing of snow. Further, a snow thrower having electric motor is more economical, easier to start and non-polluting as compared to the today available gasoline-type snow throwers. The subject invention provides a practical solution for snow throwers.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a perspective view of an alternate embodiment of the subject invention partially broken away; and FIG. 7 is a sectional view taken along lines 6—6 of FIG. 6 partially broken away.

DESCRIPTION OF THE PREFERRED EMBODIMENT

Figure 1:
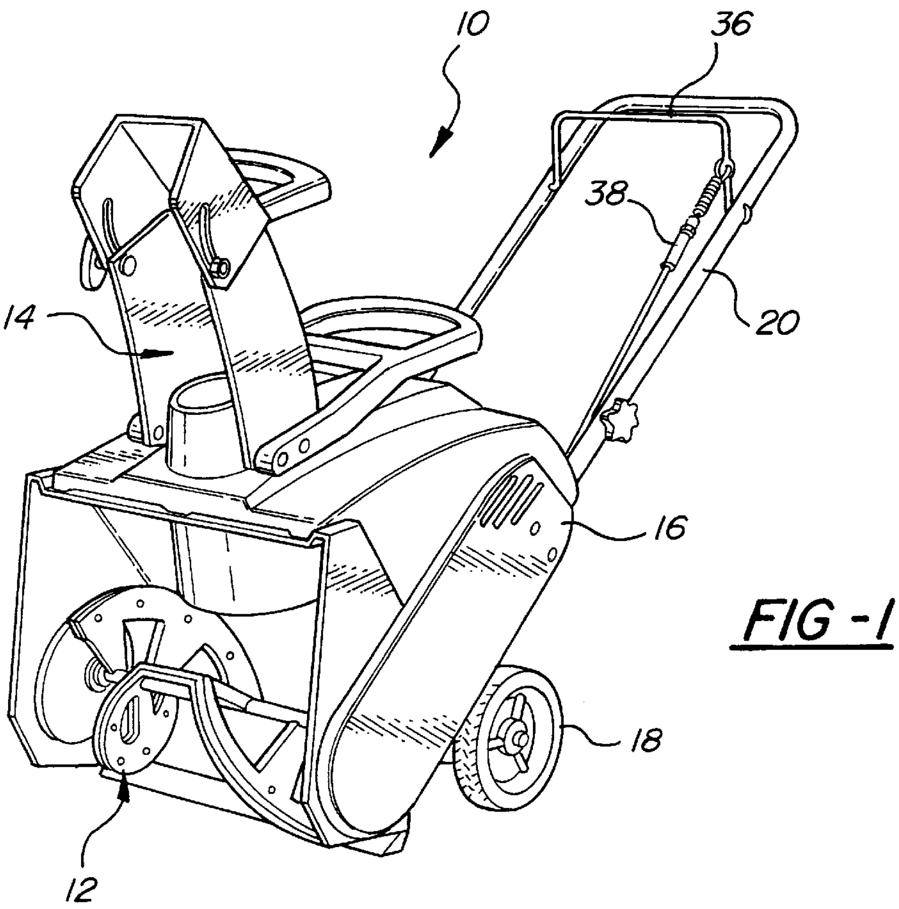
FIG. 1 is a perspective view of the subject invention.

A snow thrower apparatus is generally shown at 10 in FIG. 1. Such a snow thrower apparatus 10 is utilized for removing snow from roadways by collecting or accumulating the snow through a snow gathering device 12 and throws the snow out a chute assembly 14. The snow gathering device 12 generally comprises a rotatable wheel with gathering elements extending therefrom as commonly known in the art. Such may be of the Auger-type (shown in FIG. 1) or the paddle-type as commonly known in the art, or any other gathering design. The chute assembly 14 is also commonly known in the art, and may include any alternative embodiment.

Figure 4:
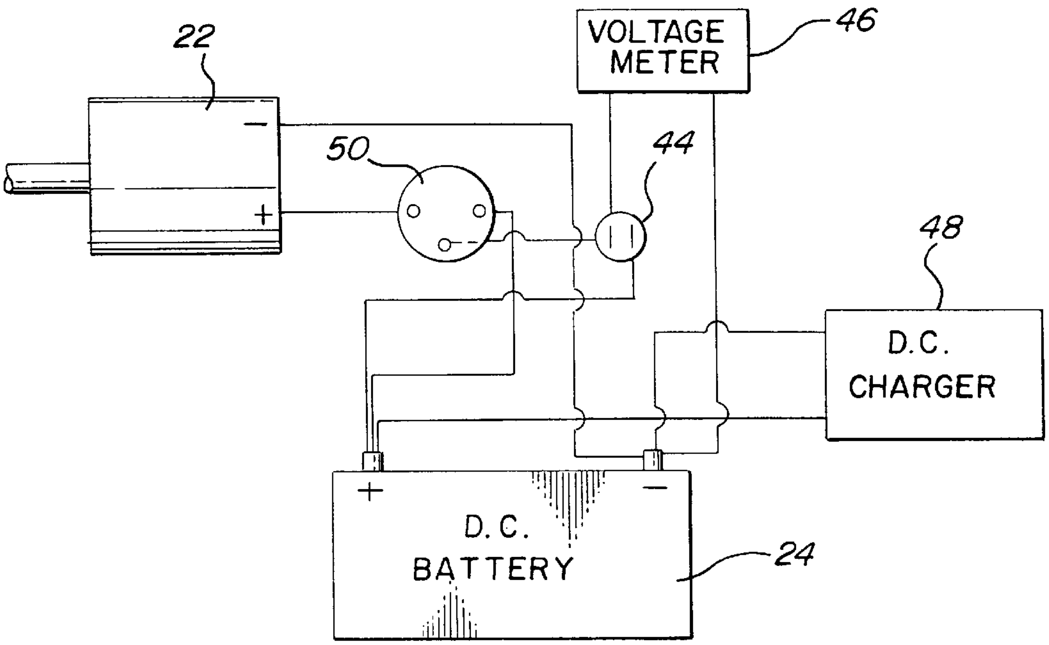
FIG. 4 is a schematic of the electrical control of the subject invention.
Figure 5:
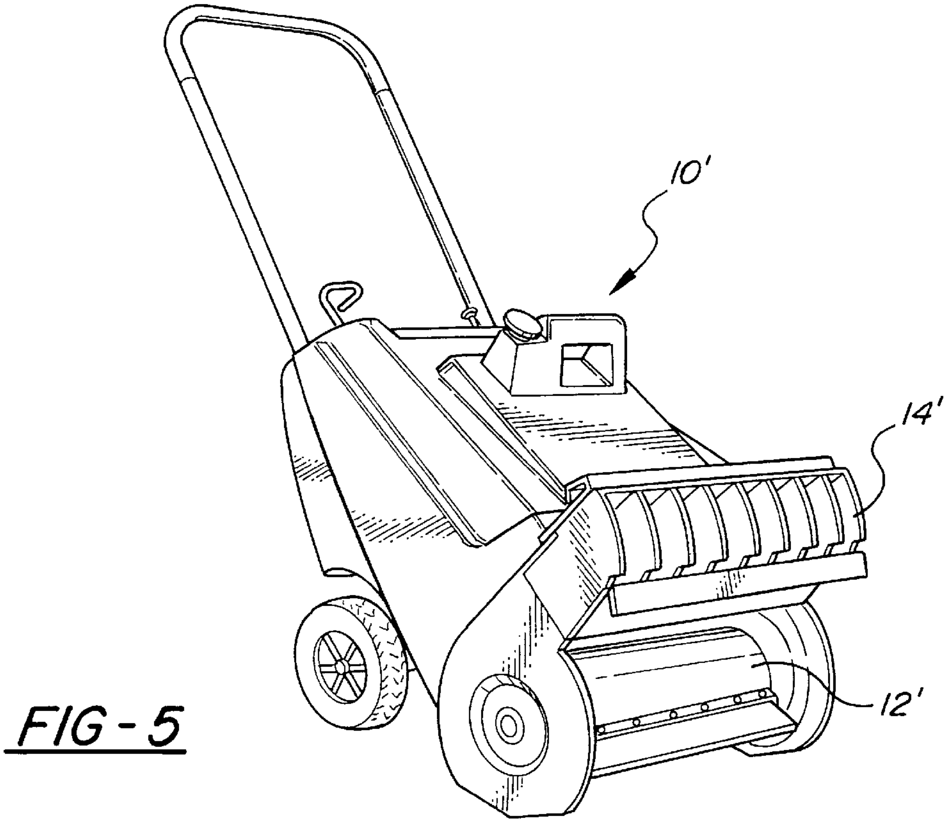
FIG. 5 is a perspective view of an alternative embodiment of the apparatus.

An alternative embodiment 10' is illustrated in FIG. 5, and includes a paddle-type wheel 12' and multiple chutes or directional vanes 14'. The invention is described with respect to FIGS. 1–4 and the embodiment 10; however, it is to be understood that such teachings may directly be applied to the alternative embodiment of FIG. 5.

The apparatus 10 includes a housing 16 supported on a pair of wheels 18 with a handle 20 extending therefrom. As known in the art, the handle 20 is operated by the user to move the housing 16 about on its wheels 18 for mobility and the collection of snow. The housing 16 supports the wheel 12 and chute assembly 14. The wheel 12 is connected at a forward portion thereof with the chute assembly 14 located thereabove. The configuration of the snow thrower apparatus 10 may be varied, and includes various designs known in the art.

The housing 16 includes and supports an electric motor 22 and a removable, quick connect battery 24 connected inside the housing 16. The electric motor 22 typically runs at 4500 rpm to turn the wheel assembly 12 at approximately 1100 rpm. It is to be understood that various motors may be utilized as desired, including but not limited to a brushless type motor. Furthermore, the motor 22 may be and ac or dc powered motor. If a dc motor is used, such could be directly connected to the battery; whereas if and ac motor is used, such would require a dc/ac converter connected to the battery (as known in electronics). The electric motor 22 and the battery 24 are connected to one another by cables 26 running in and through the housing 16 and to a control module 27.

The motor 22 is connected through a drive member 28 to a driven pulley 32 fixedly connected on the rotatable wheel 12. The drive member 28 may be typically a drive belt connected between a drive pulley 30 connected on the motor 22, and the driven pulley 32 connected on the rotatable wheel assembly 12. The pulleys 30, 32 may be adjusted in size depending upon tension and turn rate desired, as also known in the art.

Figure 2:
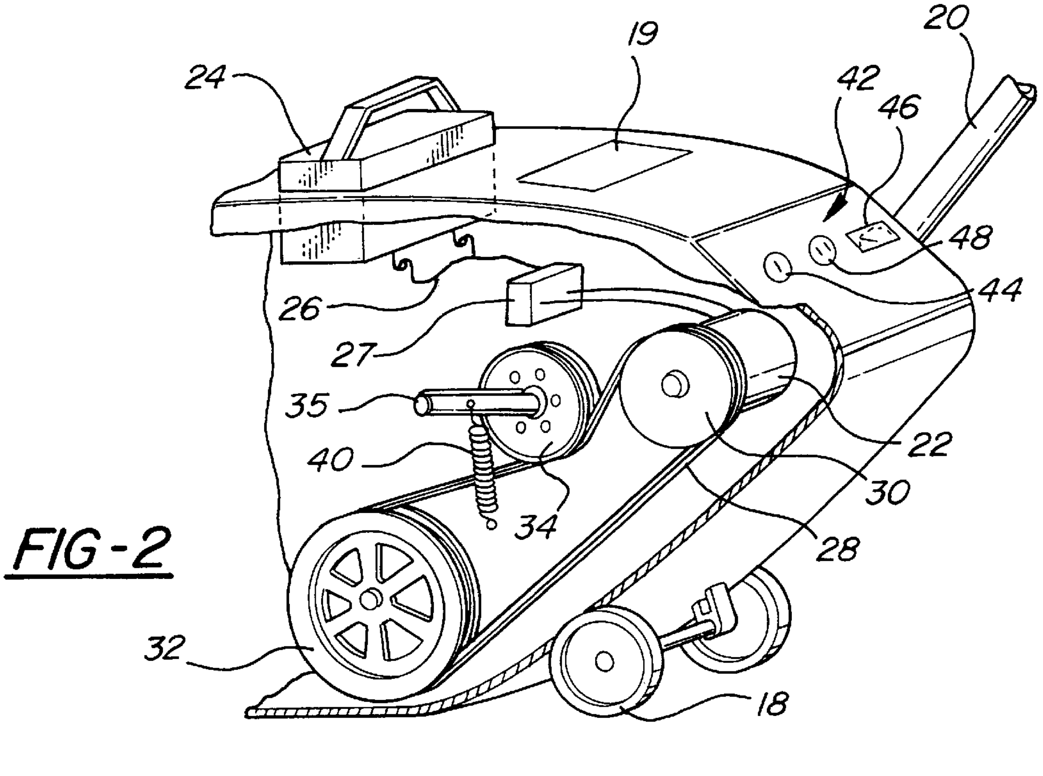
FIG. 2 is a broken away side view taken along lines 2—2 of FIG. 1.

As illustrated in FIG. 2, also included is an idler pulley 34 which may be operatively connected to a hand control bail 36 by a clutch control cable 38, which pivots the idler pulley 34 about a fixed pivot point 35 against the drive belt 28 when the bail 36 is operated by the user and moved against the handle 20 in the drive position to tension and engage the driven pulley 32 to rotate with the drive pulley 30, as known in the art. In an idle position, the bail 36 is released and the idler pulley 34 disengages the drive belt 28 to allow the belt to "disengage" the driven pulley 32. This general configuration of idler pulley 34 is also known in the art.

An alternative embodiment includes the idler pulley 34 positioned or biased to the drive position by a tension spring member 40 which is calibrated to a specific tension so that too much torque can not be drawn from the motor 22. In this embodiment, the hand rail 36 and cable 38 are omitted with the tension spring 40 being permanently installed. Therefore, whenever the apparatus 10 is turned on, the wheel assembly 12 automatically rotates with the motor 22. It is to be appreciated that the idler pulley 34 may be positioned in the drive position by other means or members.

Figure 3A:
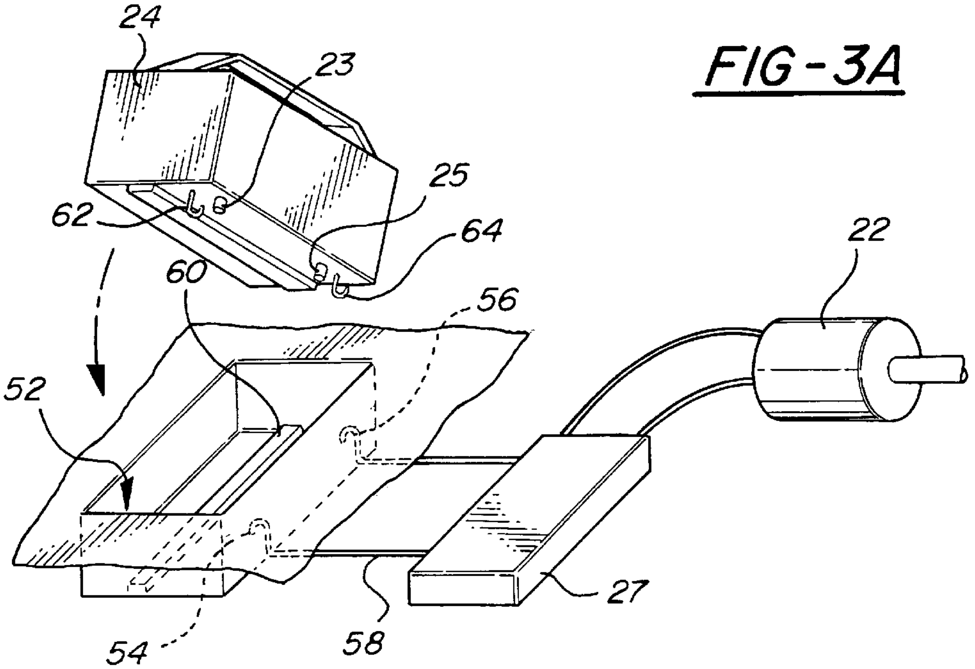
FIG. 3*a* is an exploded, perspective view of a first embodiment of the battery and connections.
Figure 3B:
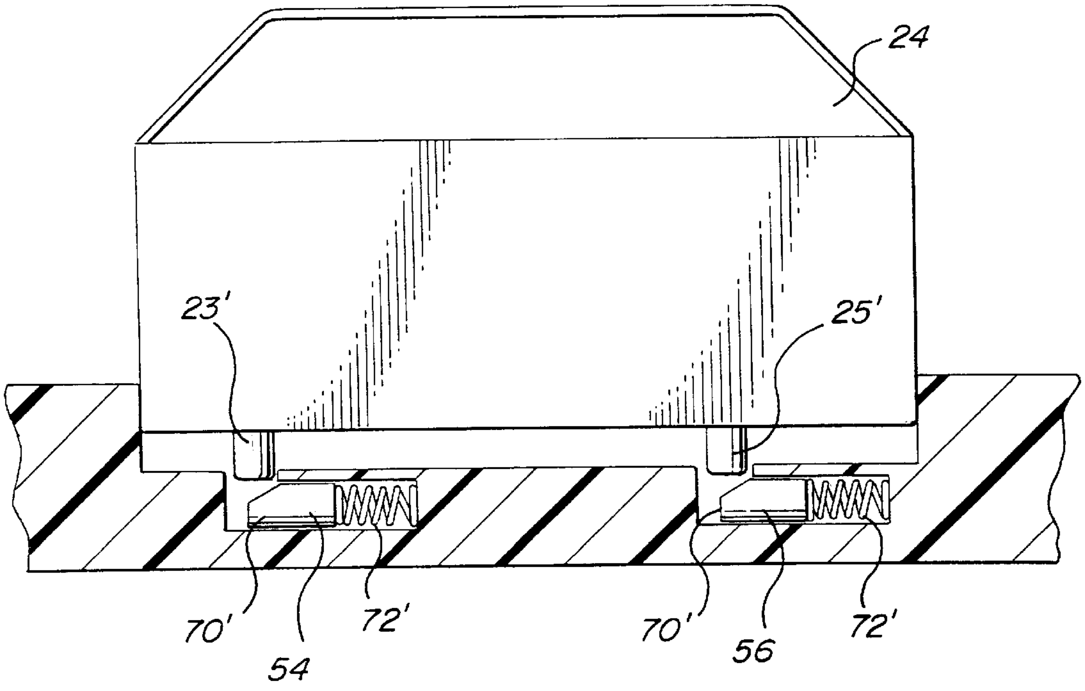
FIG. 3*b* is a cross-sectional view of a second embodiment of the battery and connections.

As illustrated in FIG. 3*a*, the housing 16 includes a battery receptacle 52 formed therein for receiving the battery 24. The battery receptacle 52 includes a pair of fixed, quick connect contacts 54, 56 extending into the battery receptacle 52, which are in turn, connected to electrical cables 58 extending through the housing 16 and to the electronic control circuit and motor 22. The battery receptacle 52 includes a generally rectangular cavity 53 with a resting boss 60 of general longitudinal length extending centrally therein to receive a boss 61 of the battery 24. The cavity 53 is of a size to receive the battery 24 securely and tightly in a predetermined position, and to maintain the battery 24 nonmoveable and electrically connected therewith. The battery 24 includes terminals 23, 25 extending therefrom with a pair of contacts 62, 63 connected thereon which engage the contacts 54, 56 when placed in the battery receptacle 52. It is to be appreciated that various contacts may be utilized, different from those discussed herein. In the preferred embodiment illustrated in FIG. 3*a*, the contacts 54, 56, 62, 63 are generally spring loaded connectors which engage and electrically contact one another when the battery 24 is placed in the battery receptacle 52 ensuring a good electrical contact therewith. Alternatively, as illustrated in FIG. 3*b*, the contacts 54', 56' may include a spring biased contact extending in on the housing 16' directly engaging the terminals 23', 25' of the battery 24'. The contacts 54', 56' include a slidable electrical pad or terminal 70' with a tapered end engaging the battery terminals 23',25', which is fixedly connected to a helix spring 72' against the housing 16 and electrically connected to the cables 58.

In operation, the battery 24 may be slid into and slid out of electrical engagement with the apparatus 10 by moving the battery 24 vertically into and out of the receptacle 52. A handle 21 may be included on a side opposing the terminals 23, 25 to aid in removal and replacement of the battery 24 with the housing 16. In this manner, more than one battery 24 can be used during clearing of an area, without the need to await recharging of the battery 24 upon each power use thereof.

The motor 22, battery 24, and drive belt 28 are enclosed within the housing 16. The top portion 17 of the housing 16 includes an access door 19, or other type of access into the interior of the housing 16, for allowing simple opening and removal/replacement of the battery 24 therethrough.

The housing 16 includes a control panel 42 on the top 17 thereof and adjacent the handle 20, for allowing operator control of the apparatus 10. The control panel 42 includes a key switch 44 or other type of on/off switch along with a dc voltage meter 46 and battery charger terminal 48. The key switch 44 has an on/off position for selectively connecting and supplying power to the controller 27 which in turn supplies power to the motor 22. The dc volt meter 46 is connected across the terminals 23, 25 of the battery 24 to provide an indication of remaining charge thereon. The battery charger receptacle 48 may be adapted to receive either external ac power with use of an ac/dc converter on the apparatus 10, or external dc power from a battery charger at the terminals 23, 25. The battery charger receptacle 48 is connected to the battery 24.

The electrical schematic of the apparatus 10 is illustrated in FIG. 4 and illustrates the interconnection of the key switch 44 to the battery 24 and the dc charger 48 across the battery 24, i.e., the control module 27. A solenoid switch 50 is connected between the positive terminals of the motor 22 and battery 24 and to the key switch 44 for controlling the supply of power to the motor 22. As can be seen, when the key switch 44 is open, the solenoid is unpowered and power is not allowed to flow from the battery to the motor 22. When the key switch 44 is closed, the electrical connectors between the motor 22 and battery 24 are connected thereby and allowing battery power to flow to the motor 22.

Another alternative embodiment of the subject invention is shown in FIGS. 6–7. In the alternate embodiment, the need for the idler pulley 34 is eliminated, and an alternate motor 22 mount is provided. Otherwise then is specifically set forth below, the snow thrower assembly 10 of this alternative embodiment is the same as it is for the embodiments shown in FIGS. 1–5. Like numerals will be used to designate like parts.

In the place of the idler pulley to tension the belt 28, there is provided an alternate electric motor 22 mount assembly. In the alternate embodiment, the motor 22 is movably, and preferably pivotally mounted to a frame structure 80 that is part of the housing 16. The motor 22 is biased by a spring 82 to tension the belt 28.

More specifically, in the alternate embodiment, a frame 80 is provided within the housing 16. The frame 80 includes a plurality of holes 84, 86. In the preferred embodiment, the frame 80 includes a pivot opening 84 and a plurality of elongated movement limiting openings 86 or slots. The openings 84, 86 are each adapted to receive a pin 88, 94, respectively. These pins 88, 94 are preferably threaded on the one end for threaded connection to the electric motor 22. The opposite end of the pin has a head 90 for preventing passage of the pin 88, 94 through the respective opening 84, 86. Furthermore, each of the pins 88, 94 may be surrounded by a bushing 92, also passing through each of the openings. The bushings 92 allow relative movement between the frame 80 and motor 22 and still allows for a tight connection therebetween.

To moveably mount the electric motor to the frame 80, a bushing 92 is placed around each of the threaded pins 88, 94. The pins 88, 94 and corresponding bushings 92, are then passed through an opening 84, 86 in the frame. The pins 88, 94 are then threaded into corresponding threaded openings in the motor 22 housing.

The pivoting motion of the motor 22 is as follows. The pivot opening 84 of the frame 80 is not elongated. It therefore allows only relative rotational movement between the frame 84 and the motor 22 and defines the pivot axis of the motor 22. The elongated slots 86 in the frame 80 allow for limited pivoting movement of the motor 22. That is, the movement limiting pins 94 can move within the elongated movement limiting openings 86 in the frame 80. With the connection made in this manner, the motor 22 is free to pivot about the pivot axis, but the pivoting motion of the motor 22 is limited by movement of the pins 94 within the elongated openings 86. Thus, the spring 82 acts to pull the motor 22, and attached shaft 96 and drive pulley 30 away from the rotatable wheel 12 and attached driven pulley 32. This tensions the belt 28 interconnecting the drive 30 and driven 32 pulleys.

The frame 80 also includes a shaft opening 98 therethrough. The shaft opening 98 allows the shaft 96 to pass through the frame 80. The motor 22 is on one side of the frame 80 with the drive pulley 30 on the opposite side. The shaft opening 98 must be large enough to allow for movement of the motor 22 with respect to the frame 80, without allowing the shaft 96 to contact the frame 80.

The pivoting movement of the motor 20 is necessary to keep tension on the belt 28. As the belt 28 wears, its effective length increases. As this happens, the spring 82 pivots the motor 22 away from the rotatable wheel 12, and thereby the driven pulley 32 to keep the drive belt 28 between the drive 30 and driven 32 pulleys tensioned. That is, the spring 82 biases the motor 22 in a direction to increase the distance between the drive 30 and driven 32 pulleys to maintain proper tension on the drive belt 28 to drive the rotatable wheel 12.

Thus, in this embodiment, the drive belt 28 is always engaged between the drive 30 and driven 32 pulleys. It may then be desirable to connect the bail 36 to the circuit controlling energization of the motor in any known manner. The electronic connection of the bail 36 can either be in place of the key switch 44 or in addition thereto.

The bail can be moved between engaged and disengaged positions. In the engaged position, the bail closes the electrical connection and allows energization of the motor 22. In the disengaged position, the bail 34 opens the electrical connection and prevents energization of the motor 22. Thus, movement of the rotatable wheel 12 in this embodiment is controlled by controlling the energization of the motor 22.

It will be appreciated that within the scope of the present invention, alternative movable mount assemblies between the motor and the frame can be used. What is important is that motor is capable of moving away from the driven pulley to keep the drive belt tensioned. For example, the mount between the frame and motor may be modified such that there are elongated linear slots forming linear tracks allowing linear movement of the motor assembly in a direction away from the snow gathering device. In this type of arrangement, the pivot pin is removed and replaced with an elongated linear track. Similarly, the elongated movement limiting slots are eliminated and replaced with an elongated linear track to allow the motor to be pulled under the force of the spring away from the snow gathering device. Similarly, an alternative biasing mechanism may be used to bias the motor in place of the spacing.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A snow thrower apparatus comprising:

a housing including a frame;

a snow gathering device rotatably connected to said housing for collecting snow;

a chute connected to said housing to direct snow away from said housing;

an electric motor moveably mounted to said frame and operatively connected to said snow gathering device by a drive member to actuate same;

an electrical supply to energize said motor;

a spring operatively interconnecting said housing and said motor to bias said motor and thereby tension said drive member;

said frame including at least one elongated movement limiting opening, and said motor including at least one opening for receiving a movement limiting pin, said motor further connected to said frame by said movement limiting pin extending through said elongated movement limiting opening of said frame and secured to said opening on said motor, whereby the movement of said motor is limited by said movement limiting pin engaging said movement limiting opening of said frame.

2. An apparatus as set forth in claim 1 wherein said motor includes a shaft and a drive pulley connected to said shaft, said snow gathering device includes a driven pulley connected thereto, said drive member operatively interconnecting said drive pulley to said driven pulley whereby said spring exerts a biasing force on said motor to thereby force said motor and said drive pulley in a direction away from said driven pulley to provide tension on said drive member.

3. An apparatus as set forth in claim 1 wherein said frame includes a pivot opening, and said motor includes an opening for receiving a pivot pin, said motor pivotally mounted to said frame by said pivot pin extending through said pivot opening of said frame and secured to said opening on said motor whereby said pivot pin defines the pivot axis of said motor.

4. An assembly as set forth in claim 3 wherein each of said pivot pins has a bushing thereabout to allow movement of said motor with respect to said frame.

5. An assembly as set forth in claim 3 wherein said electrical supply comprises a battery.

6. An assembly as set forth in claim 5 wherein said battery includes at least one terminal for electrical connection to said motor, and said housing includes a quick connect assembly for allowing quick electrical connection between said battery and said motor to allow quick removal and replacement of said battery, said quick connect assembly including a spring biased contact connected to said housing having at least one tapered end for engaging said battery terminal.

7. An apparatus as set forth in claim 6 wherein said housing includes a battery receptacle including a bottom support surface for receiving and supporting said battery in a predefined position, and said quick connect assembly extends into said receptacle below said bottom support surface for electrically contacting said battery terminals below said bottom support surface.

8. An assembly as set forth in claim 5 wherein said housing includes a handle, and a hand control bail mounted on said handle moveable between engaged and disengaged positions, said hand control bail operatively interconnected with said motor whereby when said bail is in said engaged state, said motor is energized and when said bail is in said disengaged state, said motor is not energized.

9. An apparatus as set forth in claim 8 further including a switching solenoid connected between said battery and said motor and said hand bail for controlling power to said motor.

10. An apparatus as set forth in claim 8 further including a charger terminal externally on said housing for receiving an electrical terminal supplying power to recharge said battery internally in said housing.

11. An apparatus as set forth in claim 10 wherein said snow gathering device includes a rotatable wheel operatively connected to said drive belt.

12. An apparatus as set forth in claim 11 wherein said rotatable wheel includes an auger assembly.

13. An apparatus as set forth in claim 11 wherein said rotatable wheel includes a paddle assembly.

14. An apparatus as set forth in claim 11 further including a voltmeter externally connected to said housing and with said battery for indicating charge on said battery.

15. An apparatus as set forth in claim 11 further including a key switch operating between an on and off position to control power to said battery.

16. An apparatus as set forth in claim 15 further including a switching solenoid connected between said battery and said motor and said key switch for controlling power to said motor.

17. An assembly as set forth in claim 1 wherein said drive member is a drive belt.

* * * * *